US010028291B2

United States Patent
Kotecha et al.

(10) Patent No.: US 10,028,291 B2
(45) Date of Patent: Jul. 17, 2018

(54) QUALITY OF SERVICE ACCESS DEVICE

(71) Applicants: Verizon Patent and Licensing Inc., Basking Ridge, NJ (US); Cellco Partnership, Basking Ridge, NJ (US)

(72) Inventors: Lalit R. Kotecha, San Ramon, CA (US); Jignesh S. Panchal, Somerset, NJ (US); Raafat Edward Kamel, Little Falls, NJ (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 621 days.

(21) Appl. No.: 14/017,602

(22) Filed: Sep. 4, 2013

(65) Prior Publication Data

US 2015/0063218 A1 Mar. 5, 2015

(51) Int. Cl.
*H04W 72/12* (2009.01)
*H04W 28/24* (2009.01)
*H04W 84/12* (2009.01)

(52) U.S. Cl.
CPC ............ *H04W 72/12* (2013.01); *H04W 28/24* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 8,340,110 B2* | 12/2012 | Gast | ...................... | H04W 28/18 370/395.21 |
| 2005/0025105 A1* | 2/2005 | Rue | ........................ | H04L 47/14 370/338 |
| 2006/0088034 A1* | 4/2006 | Santitoro | ............ | H04L 12/5692 370/395.21 |
| 2009/0034428 A1* | 2/2009 | Jeong | ...................... | H04L 47/10 370/252 |
| 2009/0161682 A1* | 6/2009 | Johnson | .................. | H04L 12/66 370/401 |
| 2009/0252049 A1* | 10/2009 | Ludwig | ................. | H04W 28/24 370/252 |
| 2010/0182959 A1* | 7/2010 | Cook | ................... | H04M 11/062 370/329 |

(Continued)

OTHER PUBLICATIONS

Wikipedia, "Quality of Service", http://en.wikipedia.org/w/index.php?title=Quality_of_service&oldid=571267540, Sep. 2, 2013, 12 pages.

(Continued)

*Primary Examiner* — Chirag Shah
*Assistant Examiner* — Amar Persaud (57) ABSTRACT

A device is configured to determine quality of service information and determine a set of service classes, associated with a wireless local area network, based on the quality of service information. The device is configured to determine an association between the set of service classes and a set of service identifiers. The device is configured to receive data traffic and to determine a service class, of the set of service classes, associated with the data traffic based on the association between the set of service classes and the set of service identifiers. The device is configured to schedule delivery of the data traffic based on the service class and to deliver the data traffic via the wireless local area network.

20 Claims, 8 Drawing Sheets

(56) References Cited

U.S. PATENT DOCUMENTS

| | | | | |
|---|---|---|---|---|
| 2010/0197268 A1* | 8/2010 | Raleigh | H04L 12/14 | 455/408 |
| 2010/0315971 A1* | 12/2010 | Horvath | H04W 28/24 | 370/254 |
| 2011/0110266 A1* | 5/2011 | Li | H04L 47/2491 | 370/253 |
| 2012/0099428 A1* | 4/2012 | Kamdar | H04L 41/5022 | 370/235 |
| 2012/0314568 A1* | 12/2012 | Tan | H04W 28/24 | 370/230 |
| 2013/0279521 A1* | 10/2013 | Perez Martinez | H04L 12/1407 | 370/468 |
| 2013/0336111 A1* | 12/2013 | Vos | H04W 48/08 | 370/230 |
| 2014/0173058 A1* | 6/2014 | Twitchell, Jr. | H04L 45/586 | 709/219 |
| 2014/0297805 A1* | 10/2014 | Chaplot | H04L 65/608 | 709/219 |
| 2015/0312931 A1* | 10/2015 | Jin | H04W 72/1242 | 370/329 |

OTHER PUBLICATIONS

Wikipedia, "Service Set (802.11 network)", http://en.wikipedia.org/w/index.php?title=Service_set_(801.11_network)&oldid=571468142#Service_set_identification_28SSID.29, Sep. 4, 2013, 3 pages.

* cited by examiner

| Data Traffic Type 510 | Service Class 520 | Service Class Identifier 530 | Service Identifier 540 |
|---|---|---|---|
| Voice Call | QCI-1 | 01101 | AD-545 |
| VideoApp-451 | QCI-6 | 10011 | BN-211 |

QUALITY OF SERVICE ACCESS DEVICE

BACKGROUND

A user device (e.g., a cellular telephone, a smartphone, a computer, etc.) may transmit and/or receive data traffic via a network. The data traffic may include different types of information, such as voice information, video information, email information, or the like.

DETAILED DESCRIPTION OF PREFERRED EMBODIMENTS

The following detailed description of example implementations refers to the accompanying drawings. The same reference numbers in different drawings may identify the same or similar elements.

A user device may send and/or receive data traffic of various types over a network. For example, the user device may send and/or receive voice information (e.g., voice calls), video information (e.g., video calls, video broadcasts, etc.), email information, short message service ("SMS") text message information, or the like. As the data traffic travels through the network, the data traffic may experience delay, information loss, an error, or another problem. These problems may cause the user device to perform poorly (e.g., may cause the user device to experience slow connection speeds, dropped calls, poor quality calls, etc.). To ensure that the data traffic passes through the network in a manner suitable for use by the user device, a service provider of the network may determine a threshold level of performance associated with a type of data traffic (e.g., a quality preference). Based on the threshold level of performance, the network may prioritize transmission of the type of data traffic (e.g., to ensure that the data traffic arrives at a destination within a threshold period of time, within a threshold amount of information loss, within a threshold amount of error rate, etc.).

However, some user devices may connect to the network via an access point (e.g., associated with a wireless local area network, such as a WiFi network or a similar type of network) that is not part of the network (e.g., a core network) offered by the service provider. In this instance, the service provider may not be able to prioritize transmission of different types of data traffic, and may not be able to ensure the threshold level of performance for some data traffic types (e.g., voice calls, video streams, etc.). Implementations described herein may allow an access device to apply various quality preferences to different types of data traffic to permit a user device to receive the same quality of service while connected to the access device as the quality of service offered on a service provider's network.

Figure 1:
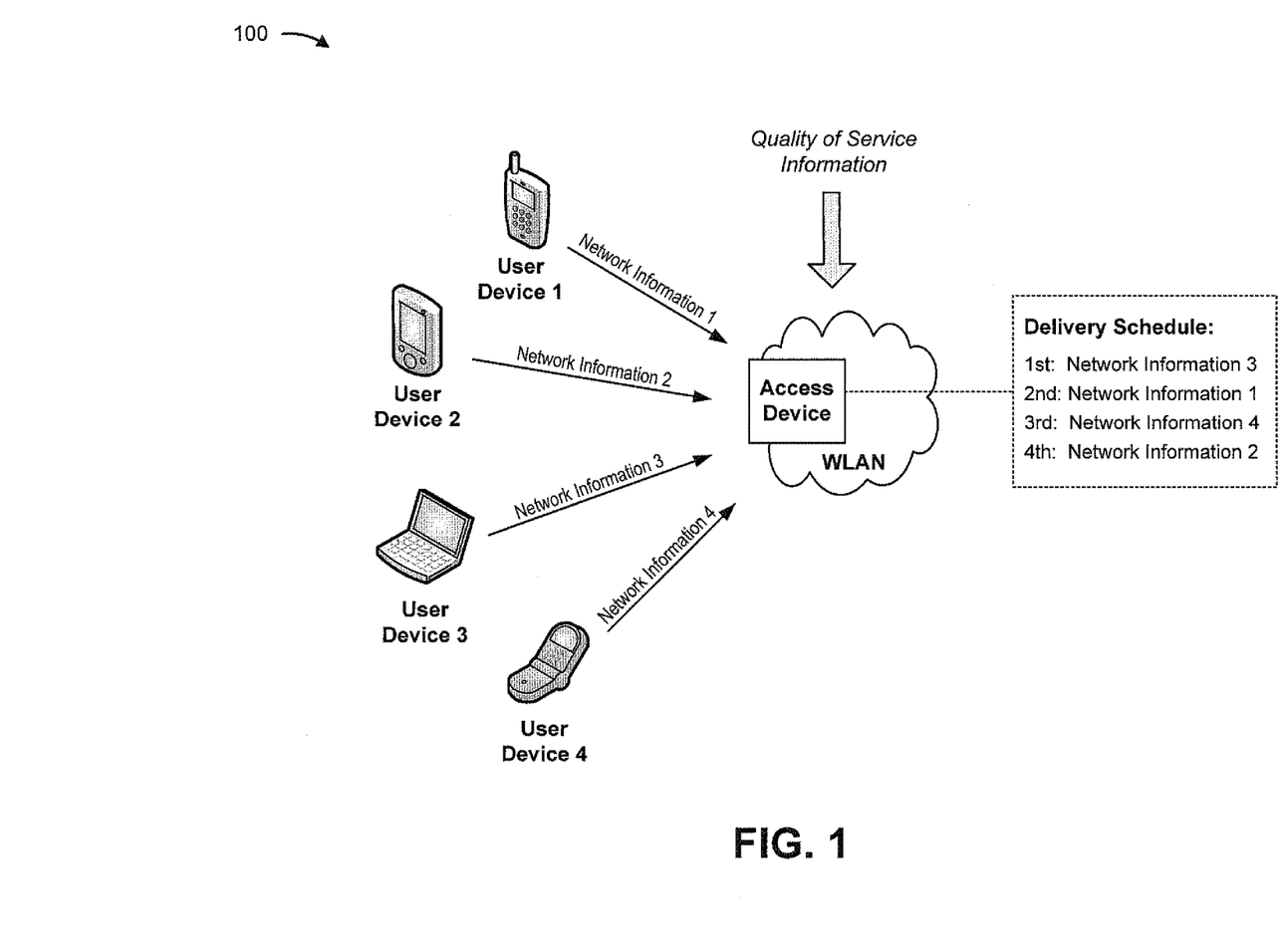
FIG. 1 is a diagram of an overview of an example implementation described herein.

FIG. 1 is a diagram of an overview of an example implementation 100 described herein. As shown in FIG. 1, example implementation 100 may include a set of user devices connected to an access device as part of a WLAN.

As shown in FIG. 1, the access device may receive quality of service information. The quality of service information may include information that permits the WLAN to prioritize delivery of different types of data traffic to ensure a particular level of performance associated with the different types of data traffic. The access device may receive data traffic (e.g., voice information, video information, email information, etc.) from the set of user devices. The access device may receive first data traffic (e.g., of a first type) from a first user device, second data traffic (e.g., of a second type) from a second user device, third data traffic (e.g., of a third type) from a third user device, and fourth data traffic (e.g. of a fourth type) from a fourth user device.

As further shown in FIG. 1, the access device may schedule delivery of the data traffic. Based on the quality of service information, and based on the data traffic type (e.g., whether the data traffic is voice information, video information, email information, etc.), the access device may prioritize delivery of the data traffic. Based on the scheduled delivery, the access device may first deliver the third data traffic, followed by the first data traffic, followed by the fourth data traffic, followed by the second data traffic. In this manner, the access device may prioritize delivery of different types of data traffic to ensure a specified level of performance for the different types of data traffic.

Figure 2:
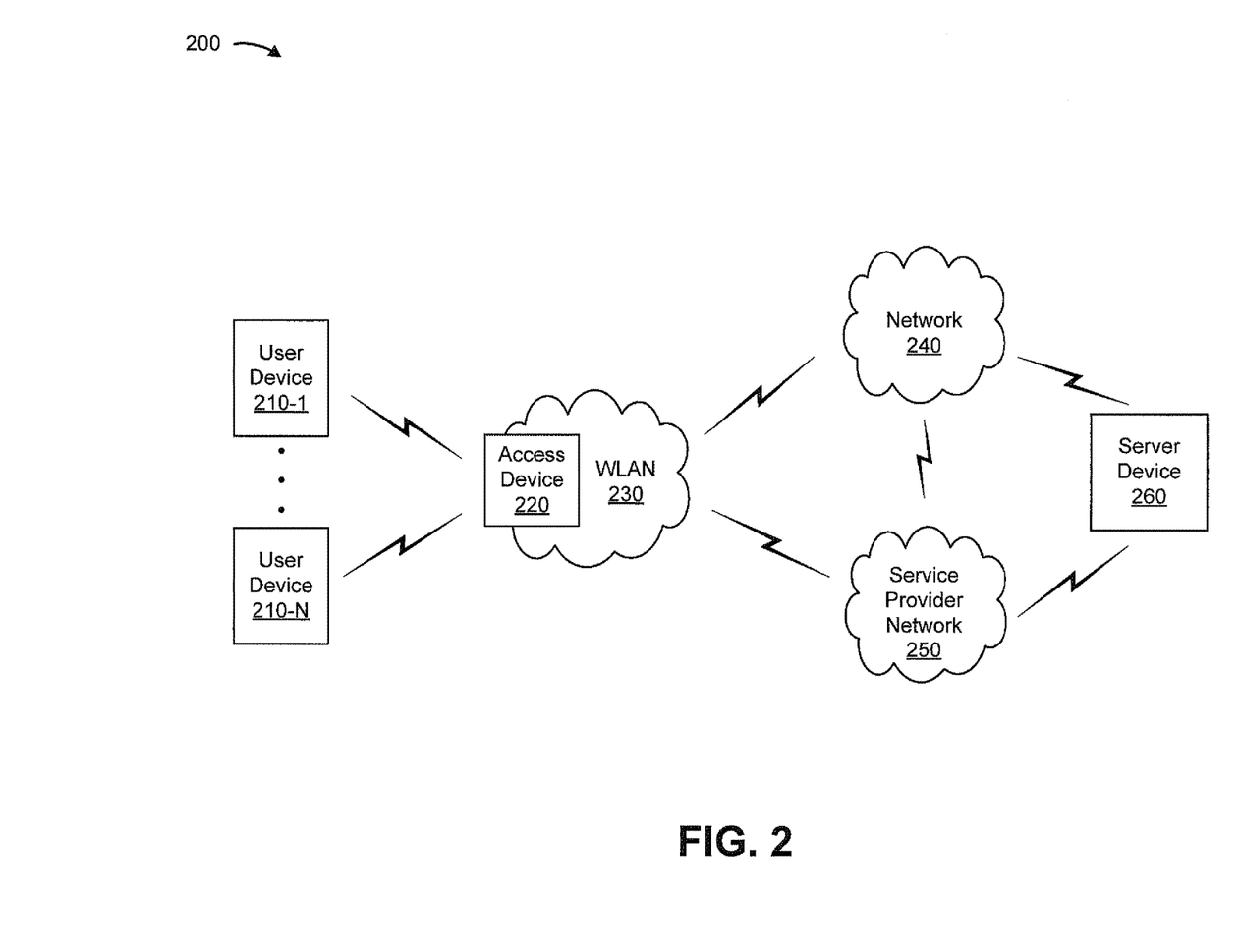
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include user devices 210-1 . . . 210-N (N≥1) (hereinafter referred to collectively as "user devices 210," and individually as "user device 210"), access device 220, wireless local access network ("WLAN") 230, network 240, service provider network 250, and server device 260. Devices of environment 200 may interconnect via wired connections, wireless connections, or a combination of wired and wireless connections.

User device 210 may include a device capable of receiving and/or transmitting data traffic, such as voice calls, video calls, or the like. For example, user device 210 may include a mobile telephone (e.g., a smartphone, a radiotelephone, etc.), a computing device (e.g., a desktop computer, a laptop computer, a tablet computer, a handheld computer, etc.), or a similar device. User device 210 may receive information from and/or transmit information to access device 220 and/or server device 260.

Access device 220 may include a device capable of regulating access to a wireless local access network ("WLAN"). For example, access device 220 may include an access point, such as a wireless access point ("WAP"), a WiFi access point, a router, a gateway, a base station, or the like. In some implementations, access device 210 may receive, process, and/or transmit data traffic, such as media, audio, video, text, and/or other data traffic, destined for and/or received from user device 210. Access device 220 may regulate access to WLAN 230.

WLAN 230 may include one or more WLANs capable of receiving and/or transmitting data traffic. In some implementations, WLAN 230 may include a WLAN associated with a set of specifications associated with the institute of electrical and electronics engineers ("IEEE"), such as IEEE 802.11 (e.g., a WiFi network). WLAN 230 may receive information from and/or transmit information to user device 210, network 240, service provider network 250, and/or server device 260 (e.g., information associated with data traffic).

Network 240 may include one or more wired and/or wireless networks. For example, network 240 may include a private internet protocol ("IP") network, a public IP network, the Internet, or the like. Network 240 may receive information from and/or transmit information to user device 210, WLAN 230, service provider network 250, and/or server device 260 (e.g., information associated with data traffic).

Service provider network 250 may include one or more wired and/or wireless networks. For example, service provider network 250 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks. In some implementations, service provider network 250 may include a core network associated with a service provider.

Server device 260 may include one or more devices capable of receiving, storing, processing, and/or transmitting information, such as data traffic. For example, server device 260 may include a computing device, such as a server, a desktop computer, a laptop computer, a tablet computer, a handheld computer, or a similar device. Server device 260 may receive information from and/or transmit information to user device 210 and/or access device 220 via network 240 and/or service provider network 250.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
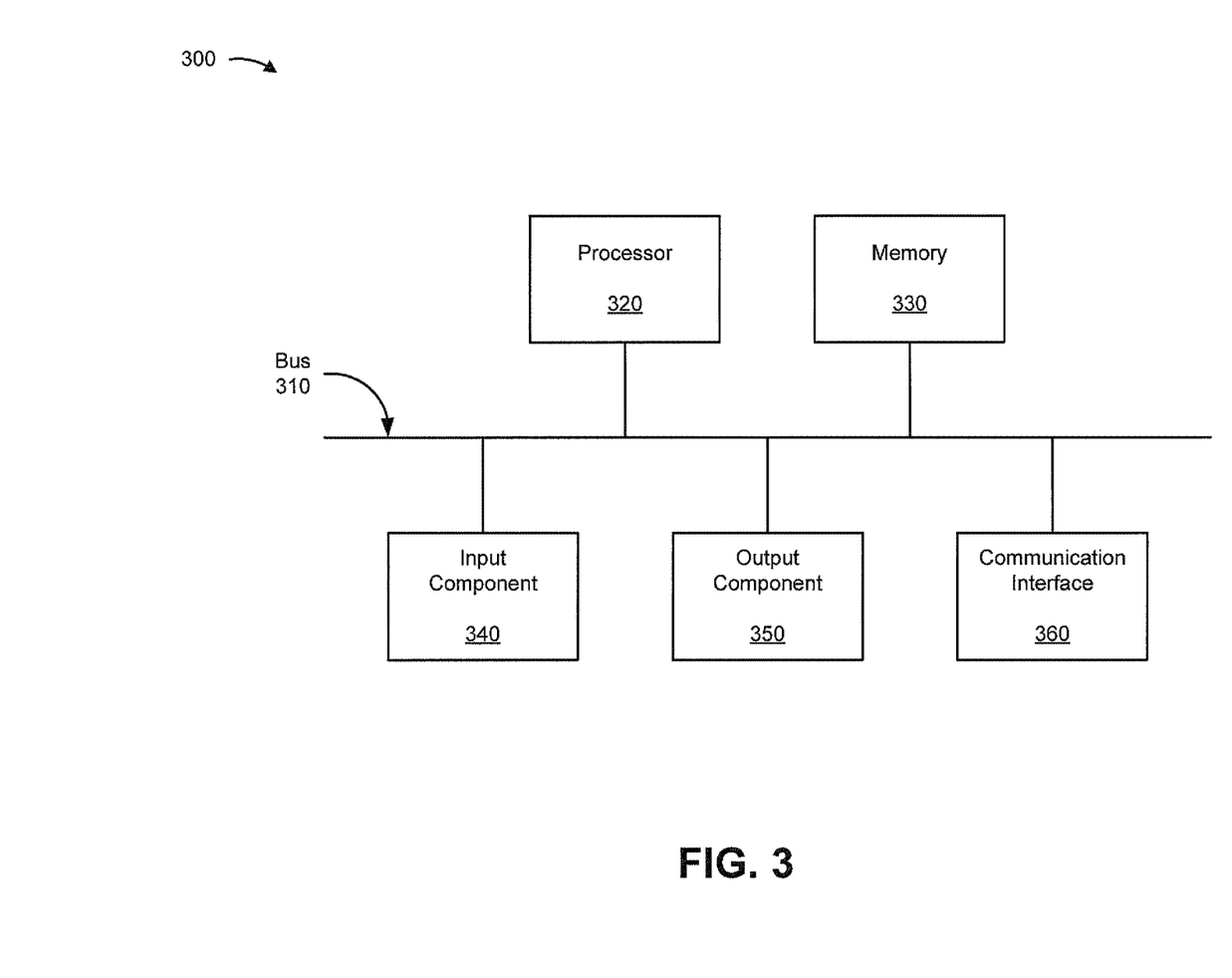
FIG. 3 is a diagram of example components of one or more devices of FIG. 2.

FIG. 3 is a diagram of example components of a device 300. Device 300 may correspond to user device 210, access device 220, and/or server device 260. Additionally, or alternatively, each of user device 210, access device 220, and/or server device 260 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
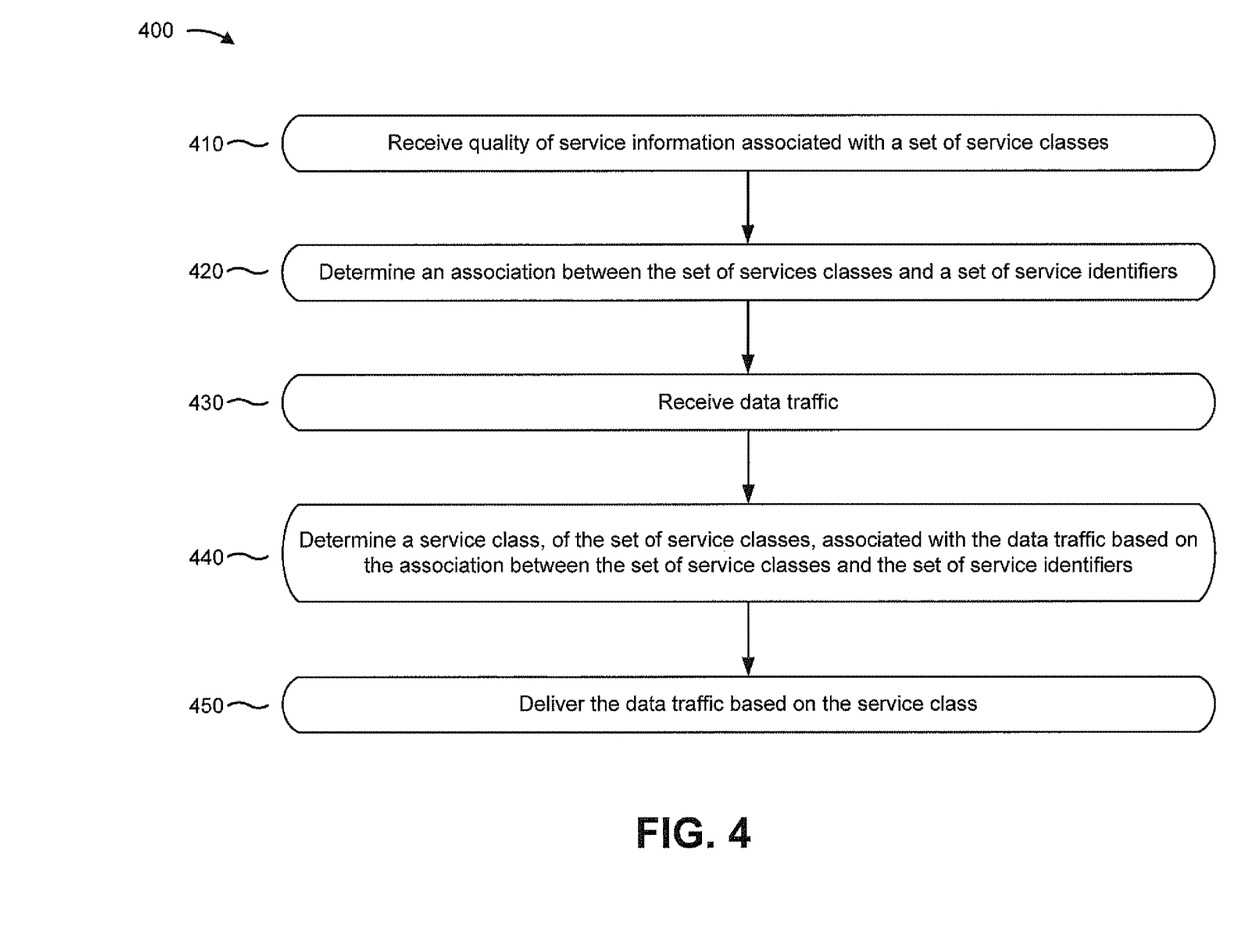
FIG. 4 is a flow chart of an example process for delivering data traffic associated with a wireless local area network based on a service class.

FIG. 4 is a flow chart of an example process 400 for delivering data traffic associated with a WLAN based on a service class. In some implementations, one or more process blocks of FIG. 4 may be performed by access device 220. Additionally, or alternatively, one or more process blocks of FIG. 4 may be performed by another device or a group of devices separate from or including access device 220, such as user device 210 and/or server device 260.

As shown in FIG. 4, process 400 may include receiving quality of service information associated with a set of services classes (block 410). For example, access device 220 may receive the quality of service information from user device 210 and/or server device 260.

In some implementations, the quality of service information may include information that permits a network (e.g., devices associated with the network) to provide different priority to different data traffic, applications, users, devices, or the like. Additionally, or alternatively, based on the priority, the quality of service information may permit the network to permit a particular level of performance for a particular type of data traffic (e.g., the quality of service information may identify a threshold level of performance associated with the data traffic).

In some implementations, the quality of service information may identify a threshold data rate associated with the data traffic (e.g., a minimum rate at which data traffic passes through the network), a threshold latency associated with the data traffic (e.g., a maximum delay associated with the data traffic), a threshold throughput associated with the data traffic (e.g., a minimum rate of successful delivery of data traffic), or the like.

In some implementations, the data traffic may include a network packet. The network packet may include a portion of the data traffic formatted for a packet-switched network. The packet-switched network may be associated with an internet protocol ("IP") network, a WLAN 230, network 240, service provider network 250, or the like. The quality of service information may identify a threshold bit rate associated with the network packet (e.g., a minimum quantity of bits processed per unit time), a threshold packet delay associated with the network packet (e.g., a maximum quantity of time for the packet to travel between two endpoints in the network), a threshold packet error rate (e.g., a maximum quantity of network packets erroneously received by a network device), or the like.

In some implementations, the quality of service information may include information that identifies a set of service classes. A service class may include a set of quality preferences associated with a type of data traffic, a type of applications, a type of devices (e.g., network devices, user devices, etc.), or the like. For example, the service class may include a set of quality preferences (e.g., a preferred data rate, a preferred delay, a preferred latency, etc.) associated with a particular type of data traffic, such as voice information, video information, email information, SMS text information, or the like. Additionally, or alternatively, the service class may be associated with broadcast information, multicast information, information provided via enhanced multimedia broadcast multicast services (e.g., "eMBMS"), or the like.

In some implementations, the quality of service information may include a default service class. For example, the default service class may be associated with data traffic that is not associated with another service class. In some implementations, the default service class may include data traffic associated with email, Internet traffic, or the like.

In some implementations, the quality of service information may include information that identifies how the data traffic is to be transmitted via a WLAN (e.g., WLAN 230). For example, the quality of service information may identify a set of relative priorities associated with the set of services classes. The set of relative priorities may permit WLAN 230 to transmit a first type of data traffic (e.g., a voice call) before transmitting a second type of data traffic (e.g., an email).

In some implementations, the data traffic may include a set of network packets, and the quality of service information may permit WLAN 230 to transmit one or more network packets of a particular type (e.g., associated with a voice call) before transmitting one or more network packets of another type (e.g., associated with an email). In this manner, the quality of service information may permit WLAN 230 to transmit the data traffic associated with the service class to satisfy the quality preferences associated with the service class (e.g., to satisfy a threshold data rate, a threshold latency, a threshold throughput, etc.).

In some implementations, the quality of service information may include a service class identifier associated with the service class. The service class identifier may include one or more characters (e.g., numbers, letters, symbols, etc.) that uniquely identify a service class. In some implementations, the service class identifier may include a quality of service class identifier ("QCI"). For example, the set of service classes may be identified by a QCI for voice calls (e.g., QCI1), a QCI for video calls (e.g., QCI2), a QCI for video streaming (e.g., QCI4), or the like.

In some implementations, the service class identifier may include a differentiated services code point ("DSCP"). For example, the data traffic may include a network packet, which may be associated with an internet protocol ("IP") header. The IP header may include the DSCP value. The DSCP value may indicate a service class associated with the network packet (e.g., may indicate a set of quality preferences associated with transmitting the network packet via a network). In some implementations, access device 220 may inspect the network packet to determine the DSCP value via packet analysis (e.g., via deep packet inspection).

As further shown in FIG. 4, process 400 may include determining an association between the set of service classes and a set of service identifiers (block 420). For example, access device 220 may determine the set of service identifiers, and may determine the association between the set of service identifiers and the set of service classes.

In some implementations, a service identifier may include an identifier that permits user device 210 to join a WLAN (e.g., to connect to access device 220). For example, the service identifier may include one or more characters (e.g., numbers, letters, symbols, etc.) that permits user device 210 to identify the WLAN (e.g., WLAN 230).

In some implementations, WLAN 230 may include a WiFi network, and the service identifier may include a service set identifier ("SSID"). For example, the SSID may include a unique identifier that includes a string of characters (e.g., a 32-character identifier). In some implementations, the SSID may be associated with a network packet, and may act as a password to permit the WiFi network to receive data traffic from user device 210 (e.g., to authenticate user device 210).

In some implementations, access device 220 may be capable of supporting multiple SSIDs. For example, a first set of user devices 210 may connect to WLAN 230 via a first SSID, a second set of user devices 210 may connect to WLAN 230 via a second SSID, and so forth. In some implementations, access device 220 may provide services depending on the SSID. For example, access device 220 may transmit data traffic at a first rate to the first set of user devices 210 associated with the first SSID, and may transmit data traffic at a second rate to the second set of user devices 210 associated with the second network identifier.

In some implementations, access device 240 may determine an association between the set of service classes and the set of service identifiers. For example, access device 220 may associate a first service class, of the set of service classes, with a first service identifier, a second service class, of the set of service classes, with a second service identifier, and so forth. In this manner, access device 220 may determine a set of service identifiers for applying one or more quality preferences to different types of data traffic (e.g., a first service identifier associated with voice information, a second service identifier associated with video information, a third service identifier associated with email information, and so forth).

In some implementations, a service identifier may be associated with a set of service classes. Additionally, or alternatively, a service class may be associated with a set of service identifiers.

In some implementations, the service class may include a QCI, and the service identifier may include an SSID. Access device 220 may associate the service class and the service identifier by associating the QCI with the SSID. Additionally, or alternatively, the service class may include a DSCP value, and access device 220 may associate the service class and the service identifier by associating the DSCP value with the SSID.

In some implementations, access device 20 may store the association in a data structure (e.g., associated with access device 220). Additionally, or alternatively, access device 220 may provide the association to another device, such as user device 210, server device 260, and/or one or more network devices in WLAN 230.

As further shown in FIG. 4, process 400 may include receiving data traffic (block 430). For example, access device 220 may receive data traffic via network 240 and/or service provider network 250 (e.g., data traffic provided by user device 210, server device 260, etc.). Additionally, or alternatively, access device 220 may receive data traffic from user device 210 (e.g., via WLAN 230 network associated with access device 220).

In some implementations, the data traffic may include a portion of data traffic to be transmitted via a network (e.g., WLAN 230, network 240, service provider network 250, etc.). For example, the data traffic may be associated with a communication, such as an email, an SMS text message, a voice call, a video, or the like. Additionally, or alternatively, the data traffic may be associated with a portion of a communication, such as a network packet. For example, the communication may include a set of network packets, and access device 220 may receive one or more network packets, of the set of network packets, from a device (e.g., user device 210, a network device associated with service provider network 250, etc.).

In some implementations, the data traffic may be associated with a service class identifier. For example, access device 220 may receive the data traffic via network 240 and/or service provider network 250. The data traffic may include a service class identifier that identifies a set of quality preferences associated with the data traffic (e.g., a QCI, a DSCP value, etc.). Additionally, or alternatively, the data traffic may be associated with a service identifier (e.g., an SSID). For example, access device 220 may receive the data traffic from user device 210 by use of the service identifier (e.g., user device 210 may provide the data traffic to access device 220 via the service identifier).

In some implementations, user device 210 may provide the data traffic based on the association between the set of service classes and the set of service identifiers (e.g., the association provided by access device 220). For example, user device 210 may generate data traffic (e.g., a voice call) using an application (e.g., a voice calling application). Based on the association between the set of service classes and the set of service identifiers, user device 210 may provide the data traffic by use of a service identifier (e.g., a particular SSID) associated with a service class (e.g., a QCI) pertaining to the type of data traffic (e.g., a voice call).

As further shown in FIG. 4, process 400 may include determining a service class, of the set of service classes, associated with the data traffic based on the association between the set of service classes and the set of service identifiers (block 440). For example, access device 220 may determine the service class based on a service class identifier. For example, access device 220 may determine the service class based on the service class identifier associated with data traffic (e.g., data traffic received via service provider network 250). In some implementations, the service class identifier may include a QCI associated with the data traffic, a DSCP value associated with the data traffic, or the like.

In some implementations, access device 220 may determine the service class based on the service identifier. For example, access device 220 may determine the service class based on the service identifier associated with data traffic (e.g., data traffic received from user device 210). In some implementations, the service identifier may include an SSID. Based on the service identifier (e.g., based on the SSID), access device 220 may determine the service class by determining which service class, of the set of service classes, is associated with the SSID. In some implementations, access device 220 may retrieve the association between the set of service classes and the set of service identifiers stored in a data structure (e.g., a data structure associated with access device 220).

As further shown in FIG. 4, process 400 may include delivering the data traffic based on the service class (block 450). For example, access device 220 may deliver the data traffic to user device 210, network 240, and/or service provider network 250 based on the service class associated with the data traffic (e.g., based on the type of data traffic associated with the data traffic).

In some implementations, access device 220 may deliver the data traffic based on a relative priority. For example, access device 220 may receive data traffic (e.g., voice calls, video broadcasts, emails, etc.). Access device 220 may prioritize delivery of the data traffic based on a set of service classes associated with the data traffic, such that access device 220 delivers a first portion of data traffic (e.g., associated with a first service class) before delivering a second portion of data traffic (e.g., associated with a second service class).

In some implementations, access device 220 may queue the data traffic for delivery at a later time (e.g., a time when access device 220 is capable of delivering the data traffic). Based on the set of classes (e.g., based on a relative priority), access device 220 may place the data traffic in the queue.

In some implementations, access device 220 may provide the data traffic by use of a scheduling algorithm (e.g., a fair queuing algorithm, a weighted fair queuing algorithm, a class based weighted fair queuing algorithm, a weighted round robin algorithm, a deficit weighted round robin algorithm, a hierarchical fair service curve algorithm, etc.). For example, the data traffic may include a set of network packets. The scheduling algorithm may determine a schedule for providing the network packets based on a relative priority associated with the network packets.

In some implementations, access device 220 may schedule delivery of network packets such that network packets associated with a low priority service class may be delivered within a reasonable time. For example, access device 220 may employ a weighted scheduling algorithm. Based on the weighted scheduling algorithm, access device 220 may assign a weight of 4 for network packets associated with a first service class (e.g., for voice calls), a weight of 2 for network packets associated with a second service class (e.g., for video streaming), and a weight of 1 for network packets associated with a third service class (e.g., for emails). When access device 220 has an opportunity to provide 7 network packets, based on the weights, access device may provide 4 network packets of the first service class, 2 network packets of the second service class, and 1 network packet of the third service class.

In some implementations, access device 220 may deliver the data traffic via a secured network connection. The secured network connection may include a connection that satisfies a threshold level of security (e.g., a level of security determined by a network service provider). For example, access device 220 may determine a secured network connection between access device 220 and service provider network 250. Based on the secure network connection, access device 220 may deliver the data traffic to service provider network 250. In some implementations, access device 220 may deliver the data traffic via the secured network connection depending on a data traffic type associated with the data traffic (e.g., depending on a service class associated with the data traffic). For example, access device 220 may deliver data traffic associated with a first data traffic type (e.g., a voice call) via the secured network, and may deliver data traffic associated with a second data traffic type (e.g., an email) via an unsecured network.

Although FIG. 4 shows example blocks of process 400, in some implementations, process 400 may include additional blocks, different blocks, fewer blocks, and/or differently arranged blocks than those depicted in FIG. 4. Additionally, or alternatively, one or more of the blocks of process 400 may be performed in parallel.

Figure 5:
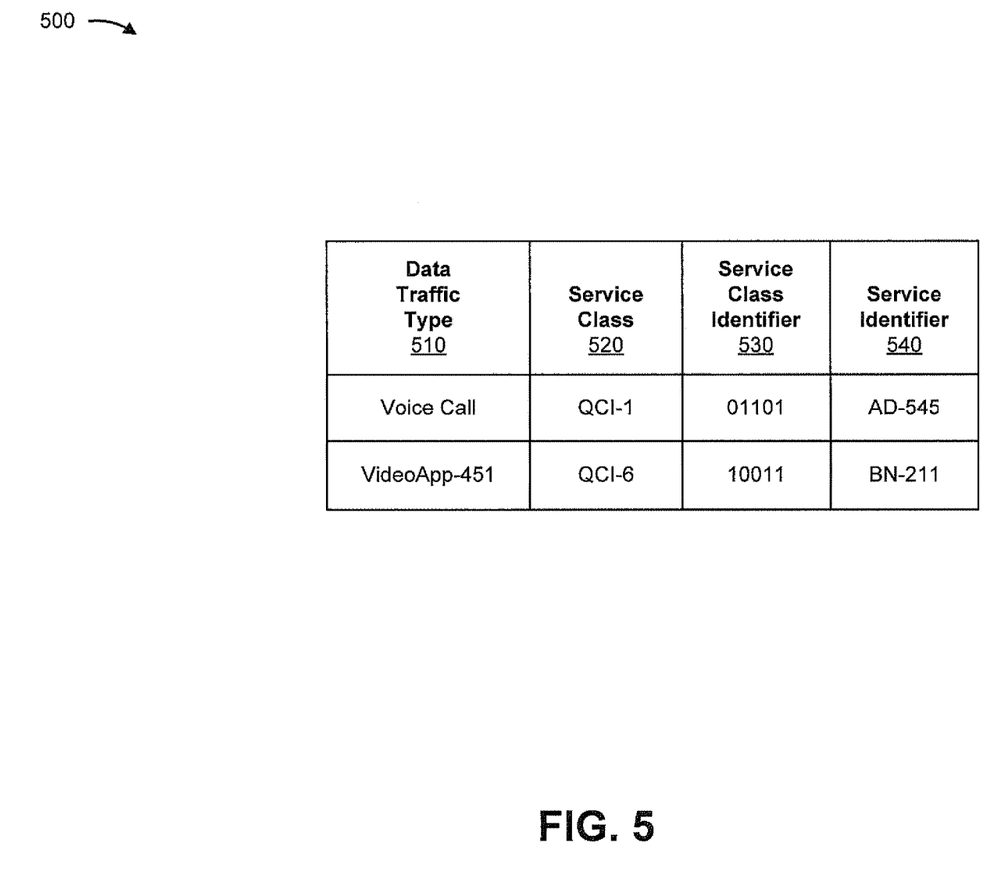
FIG. 5 is a diagram of an example data structure that stores an association between a set of service classes and a set of service identifiers.

FIG. 5 is a diagram of an example data structure 500 that stores an association between a set of service class identifiers and a set of service identifiers. Data structure 500 may be stored in a memory device (e.g., a RAM, a hard disk, etc.), associated with one or more devices and/or components shown in FIGS. 2 and 3. For example, data structure 500 may be stored by user device 210, access device 220, and/or server device 260.

Data structure 500 may include a collection of fields, such as a data traffic type field 510, a service class field 520, a service class identifier field 530, and a service identifier field 540.

Data traffic type field 510 may store information that identifies a type of data traffic. The information may include a set of numbers, letters, symbols, or the like, that identify the type of data traffic. For example, data traffic type field 510 may identify whether the data traffic is a voice call, a video call, a video broadcast, an email, an SMS text message, or the like. Additionally, or alternatively, data traffic type field 510 may include information that identifies an application (e.g., a voice calling application, a video streaming application, an email application, etc.) associated with user device 210.

Service class field 520 may store information that identifies a service class. The service class may include a set of standards for transmitting a type of data traffic, identified in data traffic type field 510, through a network. In some implementations, access device 220 may store a service class identifier that identifies the service class, such as a QCI.

Service class identifier field 530 may store information that identifies a service class identifier. The service class identifier may include one or more characters (e.g., numbers, letters, symbols, etc.) that identify a service class identified in service class field 520. In some implementations, the service class identifier may include a QCI. Additionally, or alternatively, service class identifier field may include a DSCP.

Service identifier field 540 may store information that identifies a service identifier. The service identifier may include one or more characters (e.g., numbers, letters, symbols, etc.) that identify a network name associated with access device 230. Based on the service identifier, user device 210 may provide data traffic, of the type identified in data traffic type field 510, to access device 220. Additionally, or alternatively, access device 220 may use the service identifier to provide a communication, of the type identified in network identification type field 510, to user device 210. In some implementations, the service identifier may include an SSID.

Information associated with a particular data traffic type may be conceptually represented as a row in data structure 500. For example, the first row in data structure 500 may correspond to a data traffic type indicating a voice call. Based on quality of service information, access device 220 may determine that voice calls are to be associated with a particular service class identified in service class field 520. The service class may include a set of quality of service standards (e.g., a threshold data rate, a threshold latency, a threshold throughput, etc.). Access device 220 may identify the quality of service class by use of a QCI (e.g., "QCI1"), which may correspond to a DSCP value stored in service class identifier field 530 (e.g., "01101"). Access device 220 may determine a service identifier (e.g., "AD-545) associated with the service class and/or the DSCP value.

In some implementations, access device 220 may receive data traffic via network 240. Access device 220 may determine that the data traffic is associated with the DSCP value stored in service class identifier field 530. Based on the DSCP value, access device 220 may determine that the data traffic is a voice call associated with a particular service class (e.g., "QCI1") and a particular service identifier (e.g., "AD-545"). Access device 210 may provide the data traffic to user device 210 using the service identifier stored in service identifier field 540 (e.g., "AD-545"). Based on the service class, access device 220 may prioritize delivery of the data traffic (e.g., may deliver the data traffic before delivering other data traffic received by access device 220).

In some implementations, access device 220 may receive data traffic from user device 210. The data traffic may be associated with the service identifier stored in service identifier field 540 (e.g., "AD-545"). Based on the service identifier, access device 220 may determine that the data traffic is a voice call associated with a particular service class (e.g., "QCI1"). Access device 220 may provide the data traffic to a network device associated with network 240, and may prioritize delivery of the data traffic based on the service class.

Data structure 500 includes fields 510-540 for explanatory purposes. In practice, data structure 500 may include additional fields, fewer fields, different fields, or differently arranged fields than those illustrated in FIG. 5 and/or described herein with respect to data structure 500.

Furthermore, while data structure 500 is represented as a table with rows and columns, in practice, data structure 500 may include any type of data structure, such as a linked list, a tree, a hash table, a database, or any other type of data structure. In some implementations, data structure 500 may include information generated by a device and/or component. Additionally, or alternatively, data structure 500 may include information provided from another source, such as information provided by a user, and/or information automatically provided by a device.

Figure 6A:
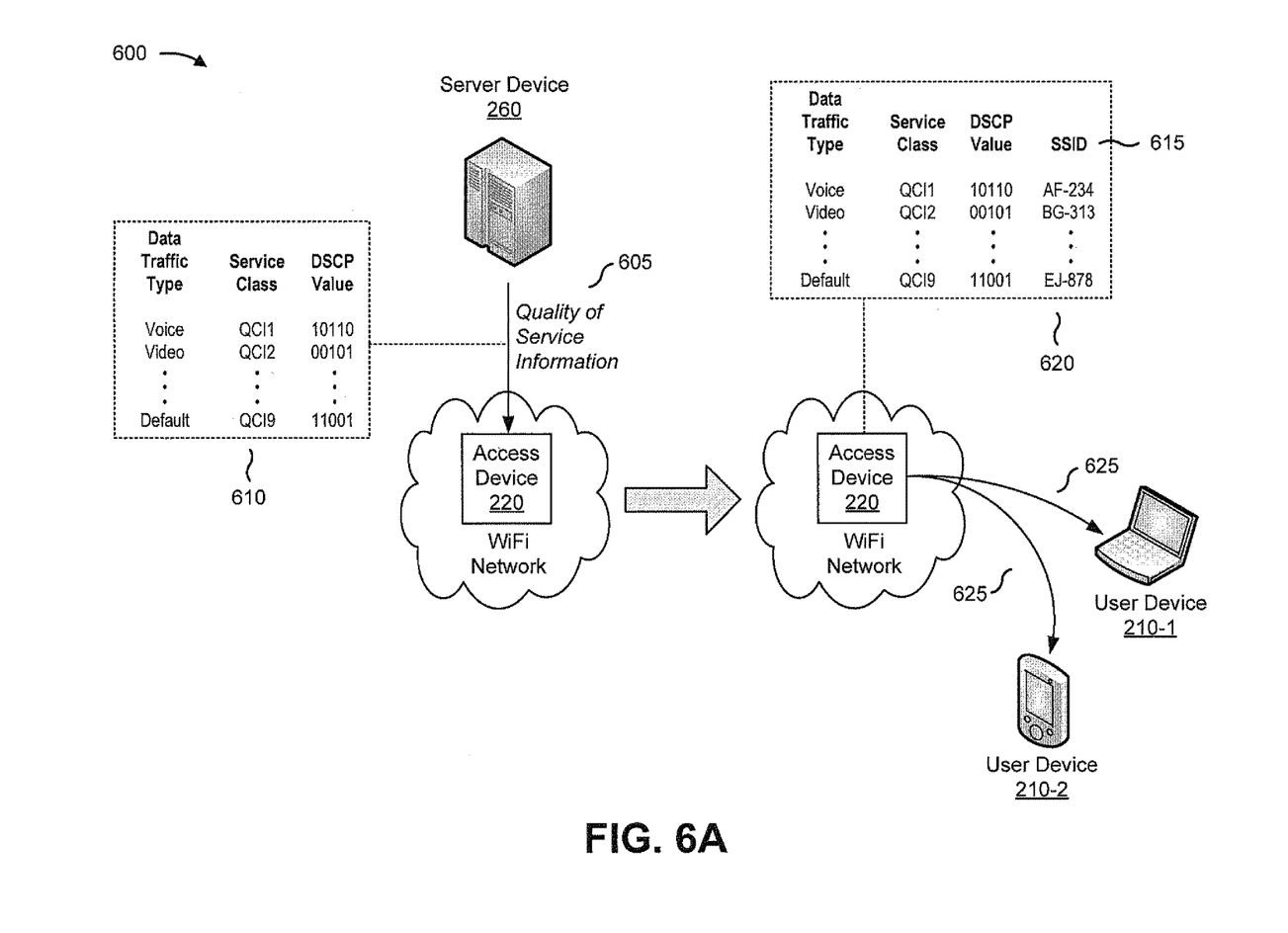
FIGS. 6A-6C are diagrams of an example implementation relating to the example process shown in FIG. 4.
Figure 6B:
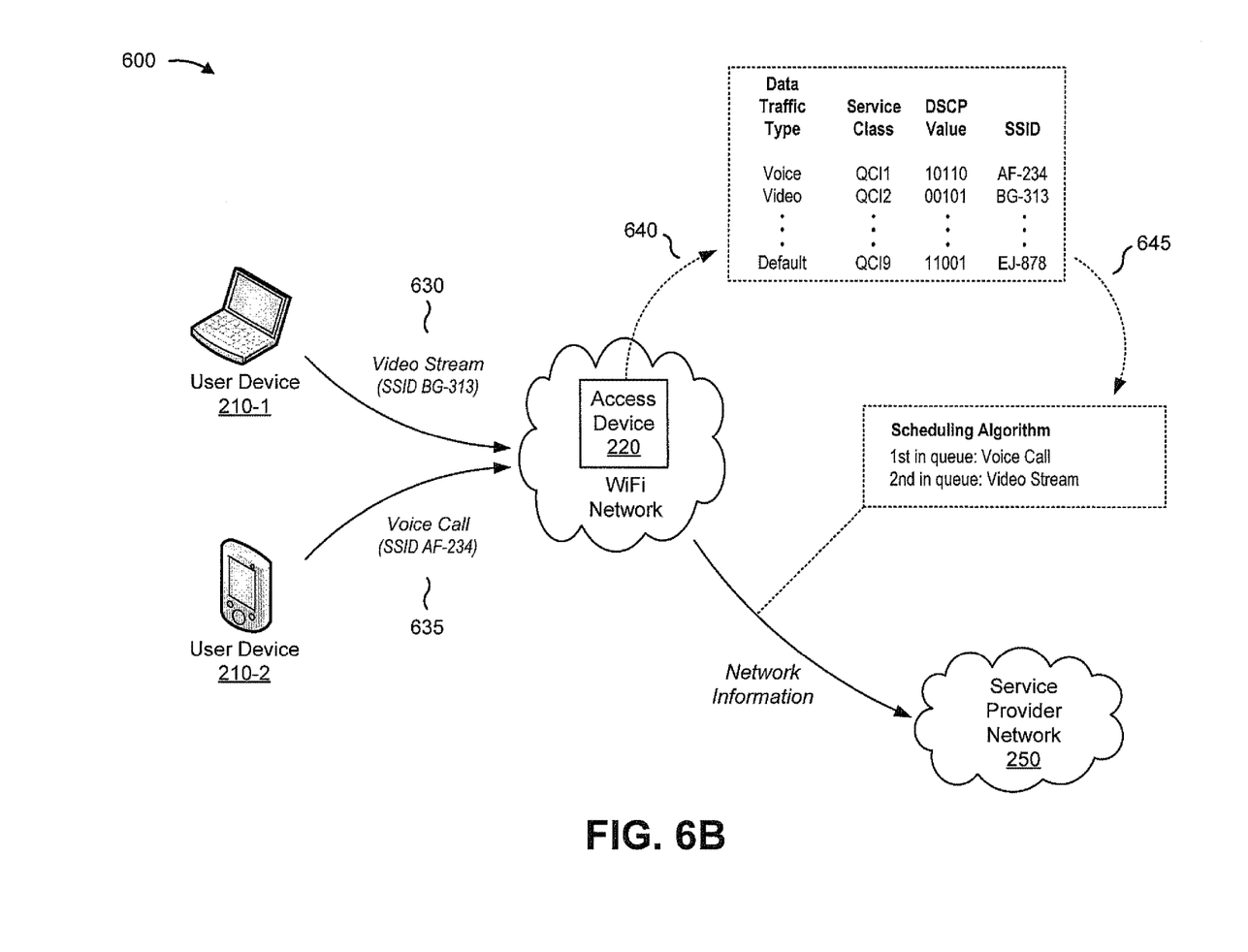
Figure 6C:
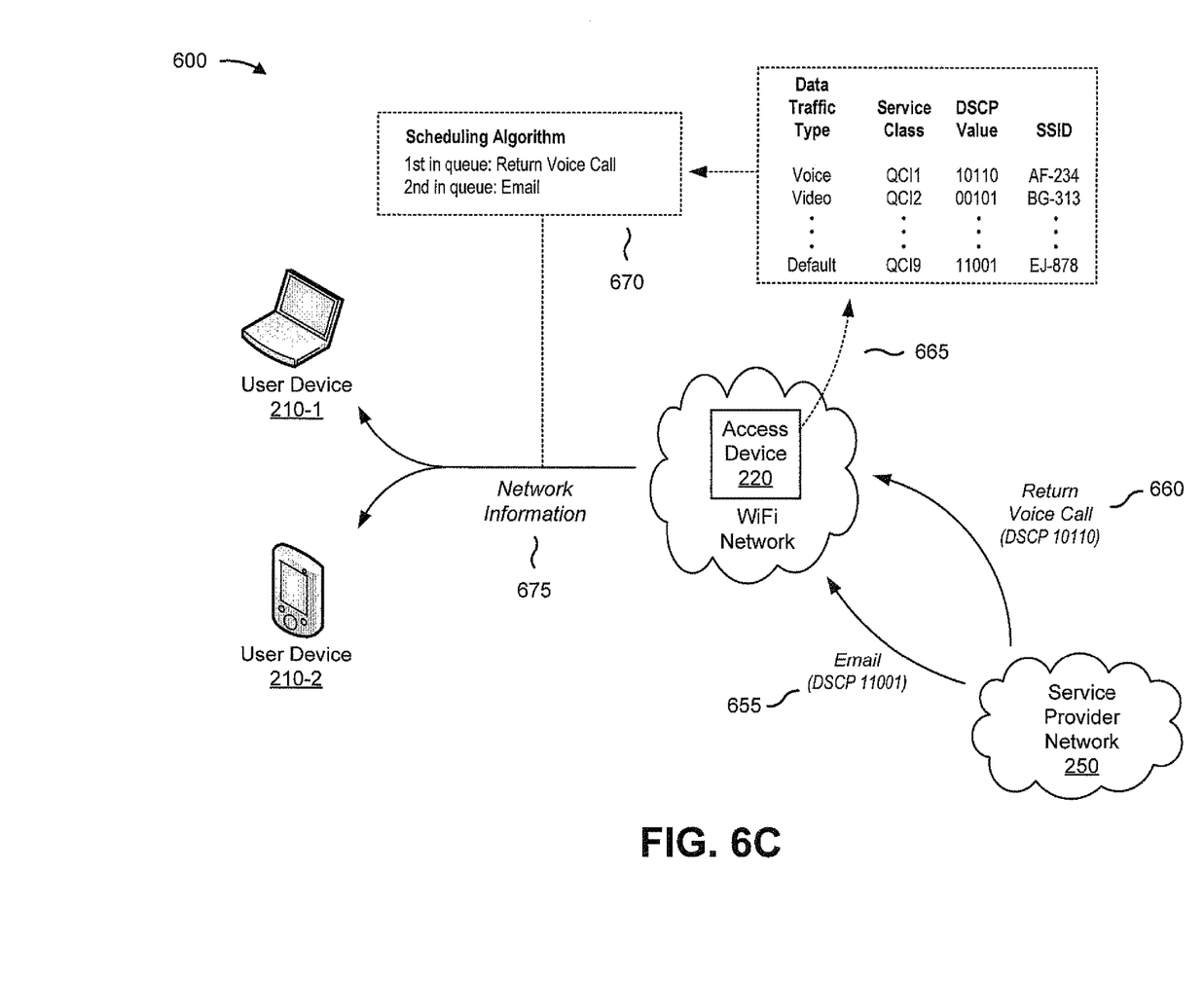

FIGS. 6A-6C are diagrams of an example implementation 600 relating to process 400 (FIG. 4). In example implementation 600, a first user device 210-1 and a second user device 210-2 may send and receive data traffic via a WiFi network associated with access device 210. Based on quality of service information, access device 220 may schedule delivery of the data traffic to ensure a desired quality of service.

As shown in FIG. 6A, and by reference number 605, access device 220 may receive quality of service information from server device 260. As shown by reference number 610, the quality of service information may include a set of data traffic types (e.g., a data traffic type for voice calls, a data traffic type for video streaming, . . . , a default data traffic type), a set of service classes associated with the set of network types (e.g., "QCI1," "QCI2," . . . , "QCI9"), and a set of DSCP values associated with set of service classes (e.g., "10110," "00101," . . . , "11001"). The quality of service information may also include a scheduling algorithm.

As shown by reference number 615, access device 220 may determine a set of SSIDs (e.g., "AF-234," "BG313," . . . , "EJ-878). As shown by reference number 620, access device 220 may associate the set of SSIDs with the set of service classes, with each service class associated with a unique SSID. Access device 220 may store the association in a data structure associated with access device 220. As shown by reference number 625, access device 220 may provide the association between the set of service classes and the SSIDs to first user device 210-1 and second user device 210-2. First user device 210-1 may store the association in a data structure associated with user device 210-1. Likewise, second user device 210-2 may store the association in a data structure associated with second user device 210-2.

As shown in FIG. 6B, and by reference number 630, first user device 210-1 may provide first data traffic to access device 220. The first data traffic may be associated with a video stream. Based on a first data traffic type, first user device 210-1 may provide the video stream to access device 220 via a first SSID (e.g., "BG-313") associated with the video stream (e.g., based on the association between the set of service classes and the set of SSIDs provided by access device 220). As shown by reference number 635, second user device 210-2 may provide second data traffic to access device 220. The second data traffic may be associated with a voice call. Based on the second data traffic type, second user device 210-2 may provide the voice call to access device 220 via a second SSID (e.g., "AF-234") associated with the voice call (e.g., based on the association between the set of service classes and the set of SSIDs provided by access device 220).

As shown by reference number 640, based on the association between the set of service classes and the set of SSIDs, access device 220 may determine a first service class (e.g., "QCI2") associated with the first data traffic received via the first SSID (e.g., "BG-313"). Likewise, based on the association between the set of service classes and the set of SSIDs, access device 220 may determine a second service class (e.g., "QCI1") associated with the second data traffic received via the second SSID (e.g., "AF-234").

As shown by reference number 645, access device 220 may schedule delivery of the first data traffic and the second data traffic, by use of a scheduling algorithm, based the service class associated with the first data traffic (e.g., "QCI2") and the service class associated with the second data traffic (e.g., "QCI1"). Based on the scheduling algorithm, access device 220 may determine that the second data traffic (e.g., network packets associated with the voice call) may be delivered before the first data traffic (e.g., network packets associated with the video stream). As shown by reference number 650, access device 220 may deliver the data traffic based on the scheduling algorithm.

As shown in FIG. 6C, and by reference number 655, access device 220 may receive third data traffic (e.g., an email), from service provider network 250, to be delivered to first user device 210-1. The email may be associated with a first DSCP value (e.g., "11001"). As shown by reference number 660, access device 220 may receive fourth data traffic (e.g., a return voice call), from service provider network 250, to be delivered to second user device 210-2. The return voice call may be associated with a second DSCP value (e.g., "10110").

As shown by reference number 665, access device 220 may determine a service class associated with the email (e.g., "QCI9") based on the first DSCP value (e.g., "11001"). Likewise, access device 665 may determine a service class associated with the return voice call (e.g., "QCI1") based on the second DSCP value (e.g., "10110"). As shown by reference number 670, access device 220 may schedule delivery of the email and the return voice call based on the service class associated with the email, and based on the service class associated with the return voice call. Access device 220 may schedule the return voice call before the email based on the service class associated with the email (e.g., "QCI9") indicating a lower priority than the service class associated with the return voice call (e.g., "QCI1"). As shown by reference number 675, access device 220 may deliver the email and the return voice call based on the delivery schedule.

As indicated above, FIGS. 6A-6C are provided merely as an example. Other examples are possible and may differ from what was described with regard to FIGS. 6A-6C.

Implementations described herein may allow an access device to apply various quality preferences to different types of data traffic to permit a user device to receive the same quality of service while connected to the WLAN as the quality of service offered on a service provider's network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. An access device, comprising:
a memory storing instructions; and
one or more processors to execute the instructions to:
receive, via a service provider network and from a server device, quality of service information,
the quality of service information including information that permits the service provider network to provide a particular quality of service on the service provider network;
determine a plurality of service classes based on the quality of service information;
determine an association between the plurality of service classes, a plurality of service class identifiers, and a plurality of service identifiers,
a first service class, of the plurality of service classes, being identified by a service class identifier of the plurality of service class identifiers,
a service identifier, of the plurality of service identifiers, identifying a network name associated with the access device, and
the service class identifier corresponding to the service identifier;
determine that a user device is connected to the access device,
the access device being part of a wireless local area network,
the wireless local area network being different from the service provider network;
apply, based on receiving the quality of service information, one or more quality preferences to permit the user device to receive a same quality of service as the particular quality of service while connected to the access device;
receive, via the wireless local area network and from the user device, data traffic;
provide information regarding the association, between the plurality of service classes, the plurality of service class identifiers, and the plurality of services identifiers, to the user device to permit the user device to associate a first portion, of the data traffic, with the service identifier based on the association between the plurality of service classes, the plurality of service class identifiers, and the plurality of services identifiers;
determine that the first service class is associated with the first portion based on a data type of the first portion being associated with the service class identifier;
determine a delivery schedule of the data traffic based on the plurality of service classes; and
deliver the data traffic, via the wireless local area network to another device using the delivery schedule,
the first portion being delivered to the service provider network before a second portion of the data traffic based on the first service class being of a higher priority than a second service class associated with the second portion and in accordance with the one or more quality preferences.

2. The access device of claim 1, where the wireless local area network is a WiFi network.

3. The access device of claim 1, where the one or more processors, when delivering the data traffic, are to:
deliver the data traffic via the wireless local area network and a secured network.

4. The access device of claim 1, where the plurality of service classes are a first plurality of service classes and the service identifier is a first service identifier;
where the one or more processors, when determining the association between the first plurality of service classes, the plurality of service class identifiers, and the plurality of services identifiers, are to:
determine an association between a second service identifier, of the plurality of service identifiers, and a second plurality of service classes, of the first plurality of service classes.

5. The access device of claim 1, where the plurality of service identifiers are a plurality of service set identifiers.

6. The access device of claim 1, where the quality of service information identifies a threshold level of performance associated with the data traffic.

7. The access device of claim 1, where the one or more processors are further to:
queue the second portion for delivery after the first portion based on the second service class being associated with the second portion.

8. A non-transitory computer-readable medium storing instructions, the instructions comprising:
one or more instructions that, when executed by one or more processors, cause the one or more processors to:
receive, via a service provider network and from a server device, quality of service information,
the quality of service information including information that permits the service provider network to provide a particular quality of service on the service provider network;
determine a plurality of service classes based on the quality of service information;
determine an association between the plurality of service classes, a plurality of service class identifiers, and a plurality of service identifiers,
a first service class, of the plurality of service classes, being identified by a service class identifier of the plurality of service class identifiers,
a service identifier, of the plurality of service identifiers, identifying a network name associated with an access device, and
the service class identifier corresponding to the service identifier;
determine that a user device is connected to the access device,
the access device being part of a wireless local area network,
the wireless local area network being different from the service provider network;
apply, based on receiving the quality of service information, one or more quality preferences to permit the user device to receive a same quality of service as the particular quality of service while connected to the access device
receive, via the wireless local area network and from the user device, data traffic;
provide information regarding the association, between the plurality of service classes, the plurality of service class identifiers, and the plurality of services identifiers, to the user device to permit the user device to associate a first portion, of the data traffic, with the service identifier based on the association between the plurality of service classes, the plurality of service class identifiers, and the plurality of service identifiers;

determine that the first service class is associated with the first portion based on a data type of the first portion being associated with the service class identifier;

determine a delivery schedule of the data traffic; and deliver the data traffic, via the wireless local area network, to another device using the delivery schedule, the first portion being delivered to the service provider network before a second portion of the data traffic based on the first service class being of a higher priority than a second service class associated with the second portion and in accordance with the one or more quality preferences.

9. The non-transitory computer-readable medium of claim 8, where the one or more instructions, when executed by the one or more processors, further cause the one or more processors to:

determine a default service class of the plurality of service classes;

receive unspecified data traffic, the unspecified data traffic including data traffic that is not identified by the first service class of the plurality of service classes;

associate the unspecified data traffic with the default service class; and deliver the unspecified data traffic based on the default service class.

10. The non-transitory computer-readable medium of claim 8, where the data traffic includes a network packet;

where the one or more instructions, when executed by the one or more processors, further cause the one or more processors to:

determine a quality preference associated with the first service class, the quality preference including at least one of:

a threshold bit rate associated with the network packet, a threshold packet delay associated with the network packet, or a threshold packet error rate associated with the network packet; and where the one or more instructions, that cause the one or more processors to determine the delivery schedule of the data traffic, cause the one or more processors to:

determine a delivery schedule of the network packet to satisfy the quality preference.

11. The non-transitory computer-readable medium of claim 8, where the one or more instructions, that cause the one or more processors to receive the data traffic, cause the one or more processors to:

receive the data traffic via a secured network.

12. The non-transitory computer-readable medium of claim 8, where the data traffic is a first data traffic, and the service identifier is a first service identifier, and where the one or more instructions, when executed by the one or more processors, further cause the one or more processors to:

receive second data traffic from a network device associated with the service provider network;

determine a second service class, of the plurality of service classes, associated with the second data traffic based on the association between the plurality of service classes, the plurality of service class identifiers, and the plurality of service identifiers;

determine a second service identifier, of the plurality of service identifiers, based on the second service class; and deliver the second data traffic to the user device based on the second service identifier.

13. The non-transitory computer-readable medium of claim 8, where the one or more instructions, that cause the one or more processors to receive quality of service information, cause the one or more processors to:

receive a scheduling algorithm; and where the one or more instructions, that cause the one or more processors to deliver the data traffic, cause the one or more processors to:

deliver the data traffic based on the scheduling algorithm.

14. The non-transitory computer-readable medium of claim 8, where the one or more instructions, when executed by the one or more processors, further cause the one or more processors to:

place the second portion in a queue for delivery after the first portion based on the second service class being associated with the second portion.

15. A method, comprising:

receiving, by an access device and via a service provider network and from a server device, quality of service information, the quality of service information including information that permits the service provider network to provide a particular quality of service on the service provider network;

determining, by the access device, a plurality of service classes based on the quality of service information;

determining, by the access device, an association between the plurality of service classes, a plurality of service class identifiers, and a plurality of service identifiers, a first service class, of the plurality of service classes, being identified by a service class identifier of the plurality of service class identifiers, a service identifier, of the plurality of service identifiers, identifying a network name associated with the access device, and the service class identifier corresponding to the service identifier;

determining, by the access device, that a user device is connected to the access device, the access device being part of a local area network, the local area network being different from the service provider network;

applying, by the access device and based on receiving the quality of service information, one or more quality preferences to permit the user device to receive a same quality of service as the particular quality of service while connected to the access device;

receiving, by the access device and via the local area network and from the user device, data traffic;

providing, by the access device, information regarding the association, between the plurality of service classes, the plurality of service class identifiers, and the plurality of services identifiers, to the user device to permit the user device to associate a first portion, of the data traffic, with the service identifier based on the association between the plurality of service classes, the plurality of service class identifiers, and the plurality of service identifiers;

determining, by the access device, that the first service class is associated with the first portion based on a data type of the first portion being associated with the service class identifier;

determining, by the access device, a delivery schedule for the data traffic; and providing, by the access device, the data traffic, via the local area network, to another device using the delivery schedule, the first portion being delivered to the service provider network before a second portion of the data traffic based on the first service class being of a higher priority than a second service class associated with the second portion and in accordance with the one or more quality preferences.

16. The method of claim 15, where at least one of:

receiving the data traffic comprises:

receiving the data traffic via a packet-switched network; or providing the data traffic comprises:

transmitting the data traffic for delivery via the packet-switched network.

17. The method of claim 15, further comprising:

determining a quality preference associated with the first service class, the quality preference including at least one of:
a threshold data rate associated with the data traffic,
a threshold latency associated with the data traffic, or
a threshold data throughput associated with the data traffic; and where determining the delivery schedule for the data traffic comprises:

determining the delivery schedule for the data traffic to satisfy the quality preference.

18. The method of claim 15, where the data traffic includes a network packet;

where the method further comprises:

determining a differentiated services code point value associated with the network packet; and determining a service class of the network packet based on the differentiated services code point value.

19. The method of claim 15, further comprising:

storing the information regarding the association between the plurality of service classes, the plurality of service class identifiers, and the plurality of service identifiers in a data structure associated with the access device.

20. The method of claim 15, further comprising:

receiving the information regarding the association between the plurality of service classes, the plurality of service class identifiers, and the plurality of service identifiers from the server device.

* * * * *